US007435893B2

(12) United States Patent
Lee

(10) Patent No.: US 7,435,893 B2
(45) Date of Patent: Oct. 14, 2008

(54) IMAGE DISPLAY DEVICE WITH BUILT-IN KARAOKE AND METHOD FOR CONTROLLING THE SAME

(75) Inventor: Jae Kyung Lee, Daegu (KR)

(73) Assignee: LG Electronics Inc., Seoul (KR)

( * ) Notice: Subject to any disclaimer, the term of this patent is extended or adjusted under 35 U.S.C. 154(b) by 264 days.

(21) Appl. No.: 10/950,667

(22) Filed: Sep. 28, 2004

(65) Prior Publication Data

US 2005/0072293 A1 Apr. 7, 2005

(30) Foreign Application Priority Data

Oct. 6, 2003 (KR) ...................... 10-2003-0069352

(51) Int. Cl.
*G09B 5/00* (2006.01)

(52) U.S. Cl. ........................ 84/600; 84/601; 434/307 A

(58) Field of Classification Search ................... 84/600, 84/601; 434/307 A
See application file for complete search history.

(56) References Cited

U.S. PATENT DOCUMENTS 5,469,370 A * 11/1995 Ostrover et al. ............. 711/111
6,535,467 B1 * 3/2003 Jung et al. ............... 369/47.16
2006/0050794 A1 * 3/2006 Tan et al. ............... 375/240.26

FOREIGN PATENT DOCUMENTS

| | | | |
|---|---|---|---|
| CN | 2113529 | U | 8/1992 |
| CN | 1180230 | A | 4/1998 |
| CN | 1402588 | A | 3/2003 |
| CN | 1442799 | A | 9/2003 |

OTHER PUBLICATIONS

Chinese Office Action dated Jun. 8, 2007.

* cited by examiner

*Primary Examiner*—Lincoln Donovan
*Assistant Examiner*—David S. Warren
(74) *Attorney, Agent, or Firm*—KED & Associates, LLP

(57) ABSTRACT

An image display device with a built-in karaoke and a method for controlling the same are disclosed, wherein an audio of a broadcasted program is divided into a plurality of elements, so as to be selectively controlled when required. The method for controlling the image display device with a built-in karaoke includes receiving an output signal and demultiplexing the received signal into an accompaniment signal and a vocal signal, and selectively outputting the accompaniment signal and the vocal signal both included in the received signal, when a user selects an accompaniment mode.

16 Claims, 3 Drawing Sheets

IMAGE DISPLAY DEVICE WITH BUILT-IN KARAOKE AND METHOD FOR CONTROLLING THE SAME

CROSS-REFERENCE TO RELATED APPLICATIONS

This application claims the benefit of Korean Application No. P2003-069352, filed on Oct. 6, 2003, which is hereby incorporated by reference as if fully set forth herein.

BACKGROUND OF THE INVENTION

1. Field of the Invention

The present invention relates to an image display device, and more particularly, to an image display device with a built-in karaoke and a method for controlling the same. Although the present invention is suitable for a wide scope of applications, it is particularly suitable for storing the accompaniment of a song being televised on a broadcast program, thereby providing the newly stored accompaniment to the user.

2. Discussion of the Related Art

A song accompaniment refers to reproducing music for individuals who wish to sing by playing the tune of a corresponding song with various musical instruments. Recently, with the development of electronics technology, an automated accompaniment, wherein the sounds of a plurality of instruments are synthesized, is provided to a user through a karaoke apparatus. In a general karaoke apparatus, when providing a user with an accompaniment having no human voice included, a plurality of digitalized audio signals are decoded and outputted through a speaker. Then, a background image is displayed on a monitor screen, whereby lyrics of the corresponding song are simultaneously displayed on the screen in concurrence with the accompaniment.

However, the above-described karaoke apparatus is too expensive to be provided to each household. In addition, the range of accompaniments provided to the user is limited to songs stored within a memory of the apparatus. Furthermore, the related art karaoke apparatus does not provide the vocal (i.e., the voice of the singer) of the corresponding song. Therefore, when the user is not used to or unfamiliar with a selected song, it is difficult for the user to sing the song correctly with the correct key and rhythm.

SUMMARY OF THE INVENTION

Accordingly, the present invention is directed to an image display device having a built-in karaoke and a method for controlling the same that substantially obviate one or more problems due to limitations and disadvantages of the related art.

An object of the present invention is to provide an image display device having a built-in karaoke and a method for controlling the same providing a song accompaniment to a user and selectively controlling a volume of the song accompaniment and a vocal volume.

Another object of the present invention is to provide an image display device and a method for separately storing a caption and a singer's vocal corresponding to a song being televised on a broadcast program and providing the stored caption and vocal to the user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an image display device includes a demultiplexer demultiplexing a received signal into a video signal, an audio signal, and supplemental information, the supplemental information comprising an accompaniment signal and a vocal signal, a video signal processor converting the video signal into a displayable signal, an audio signal processor converting the audio signal into a sound signal being able to outputted by a speaker, and a microcomputer controlling the audio signal processor, so as to selectively output the accompaniment signal and the vocal signal both included in the audio signal, when a user selects an accompaniment mode.

The microcomputer determines whether an accompaniment and a vocal of a song from a broadcasted program can be selectively controlled and represented based on the supplemental information, and also displays one of an icon and a message on a screen to inform the user that the accompaniment and the vocal can be selectively controlled and represented.

In addition, the microcomputer stores the accompaniment signal and the vocal signal in a memory in accordance with a user command, and provides the accompaniment signal and the vocal signal, both stored in the memory, to the audio signal processor in accordance with the user command. Moreover, the microcomputer displays a list of songs corresponding to the accompaniment signal and the vocal signal, both stored in the memory, on a screen in accordance with the user command.

The microcomputer displays one of a menu and a window on a screen, so as to allow the user to selectively control and represent the accompaniment and the vocal, and selectively controls a volume, a key level, and a tone of the accompaniment and the vocal in accordance with the user command.

The signal divider divides the audio signal into the accompaniment signal and the vocal signal depending upon a control of the microcomputer.

In another aspect of the present invention, a method for controlling an image display device includes receiving an output signal and demultiplexing the received signal into an accompaniment signal and a vocal signal, and selectively outputting the accompaniment signal and the vocal signal both included in the received signal, when a user selects an accompaniment mode.

After identifying the supplemental information, a set of information related to an accompaniment volume, a vocal volume, an accompaniment frequency band, and a vocal frequency band is displayed on the screen.

The method for controlling the image display device further includes determining whether the accompaniment signal and the vocal signal are included in different streams, based on the supplemental information, and determining whether the accompaniment signal and the vocal signal can be selectively controlled and represented, based on the supplemental information. Herein, one of an icon and a message is displayed on a screen, so as to notify that the accompaniment signal and the vocal signal can be selectively controlled and represented, when the accompaniment signal and the vocal signal are determined to be controllable and representable.

The method for controlling the image display device further includes storing the accompaniment signal and the vocal signal in a memory in accordance with a user command, displaying a list of songs corresponding to the accompaniment signal and the vocal signal, both stored in the memory, in accordance with a user command, and reading and selectively outputting the accompaniment signal and the vocal signal of a song selected from the list from the memory.

Furthermore, the method further includes converting the accompaniment signal and the vocal signal, so as to selectively control a volume, a key level, and a tone of the accompaniment and the vocal in accordance with the user command, and displaying one of a menu and a window enabling the user to selectively control and represent the accompaniment and the vocal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
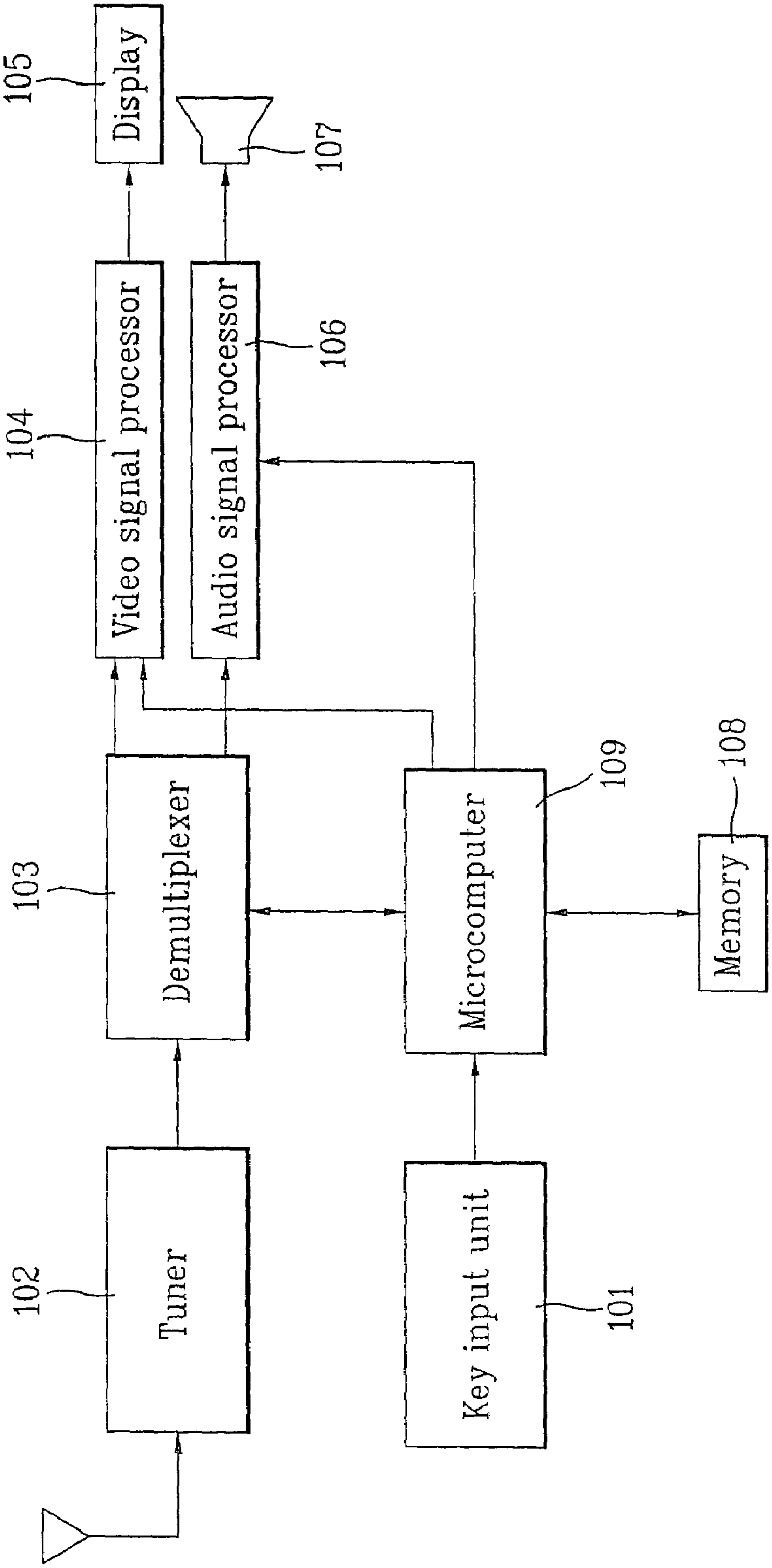
FIG. 1 illustrates a block diagram of an image display device having a built-in karaoke according to the present invention.

FIG. 1 illustrates a block diagram of an image display device having a built-in karaoke according to the present invention.

Referring to FIG. 1, among a plurality of broadcast signals, a tuner 102 selectively receives a broadcast signal of a selected channel through an antenna or a cable receiver. Then, a demultiplexer 103 divides the received broadcast signal into an image signal, an audio signal, supplemental information, and channel information. A video signal processor 104 receives the image signal and subtitle (superimposed caption) data included in the supplemental information, and converts the received signal and data into displayable signals. An audio signal processor 106 receives the audio signal and converts the signal so that the converted signal is outputted as a sound through a speaker 107.

A key input unit 101 receives a user command and transmits the user command to a microcomputer 109. The microcomputer 109 controls each component of the device shown in FIG. 1 in accordance with the user command. More specifically, when the user selects an Accompaniment Mode, the microcomputer 109 controls the audio signal processor 106 so as to selectively control an accompaniment signal and a vocal signal, which are both included in the audio signal. Based on the user's command, the microcomputer 109 may store the accompaniment signal and the vocal signal into a storage unit (i.e., a memory 108), and the microcomputer 109 can represent the stored signals in a future usage.

In FIG. 1, an example of the display device is given as a television receiver, however, the present invention is not limited only to the television receiver, but can also be applied to a wide range of other display devices, such as personal computers (PCs), mobile phones, personal digital assistants (PDAs), and so on.

The method for providing an accompaniment to the image display device according to the present invention will now be described.

In order to transmit a broadcast signal to the image display device of a user, a broadcasting station encodes and multiplexes a video signal, an audio signal, supplemental information, channel information, and so on. And, when the sound of a broadcasted music program is converted into an audio signal, so as to provide the user with a song accompaniment, the accompaniment and the vocal (i.e., the voice of the singer of the broadcasted song) are divided and converted. For example, when producing the program, the vocal and the accompaniment are divided and recorded and, then, each converted into an audio signal.

The supplemental information includes a variety of information related to the broadcasted program. More specifically, in case of a broadcasted music program, the supplemental information includes information on an accompaniment volume and a singer's vocal volume, and information on a frequency band of the accompaniment and a frequency band of the vocal. Herein, the information on the volumes of the accompaniment and the vocal included in the supplemental information may be information indicating a ratio of the volumes of the accompaniment and the vocal upon the production of the broadcast program. Moreover, the supplemental information optionally include information determining whether the Accompaniment Mode can be performed, information determining whether the accompaniment and the vocal can be selectively controlled and represented, and information on the lyrics and the singer of the song.

Figure 2A:
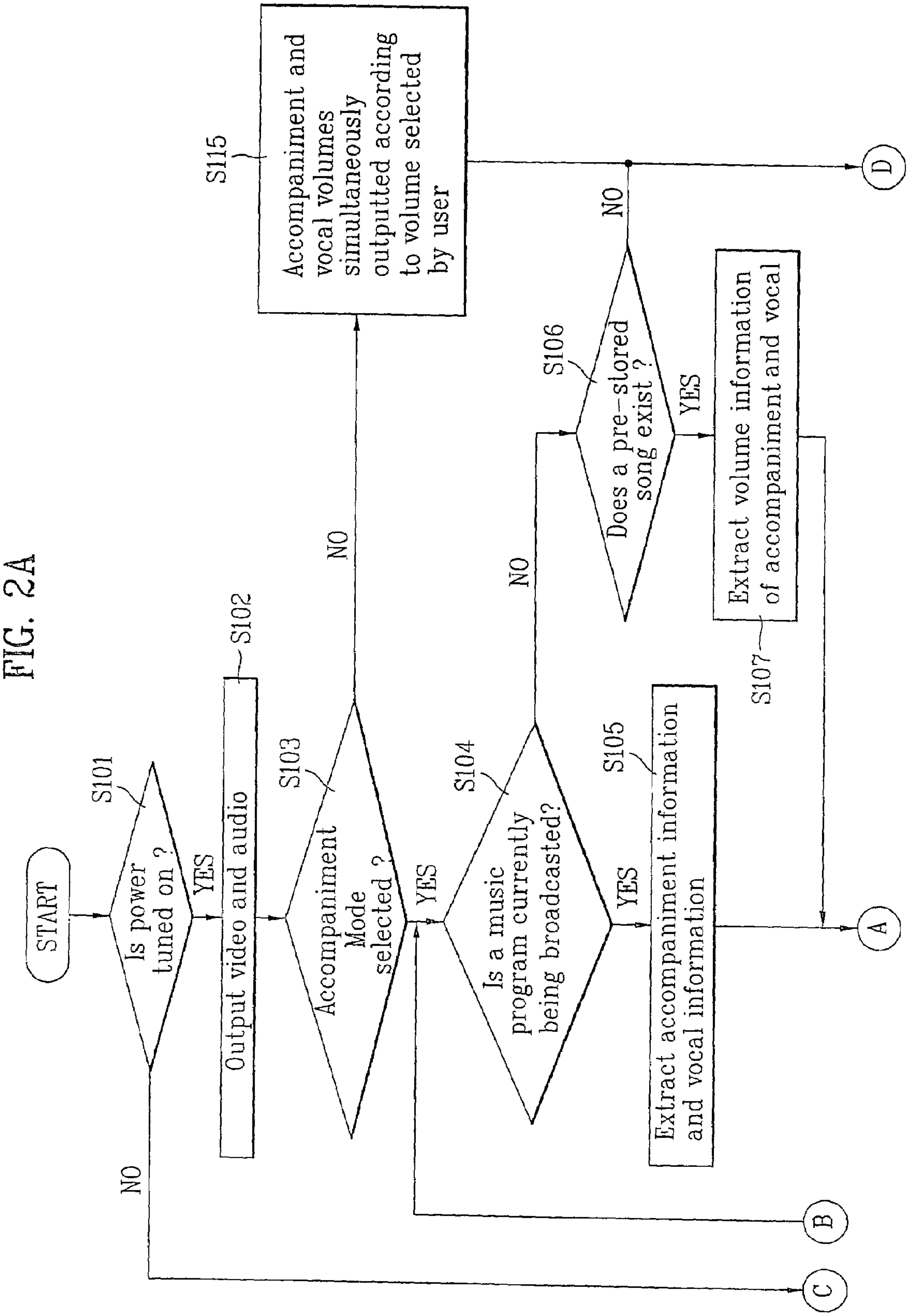
FIG. 2*a* and FIG. 2*b* illustrate a flow chart showing the process steps for providing an accompaniment to the image display device according to the present invention.
Figure 2B:
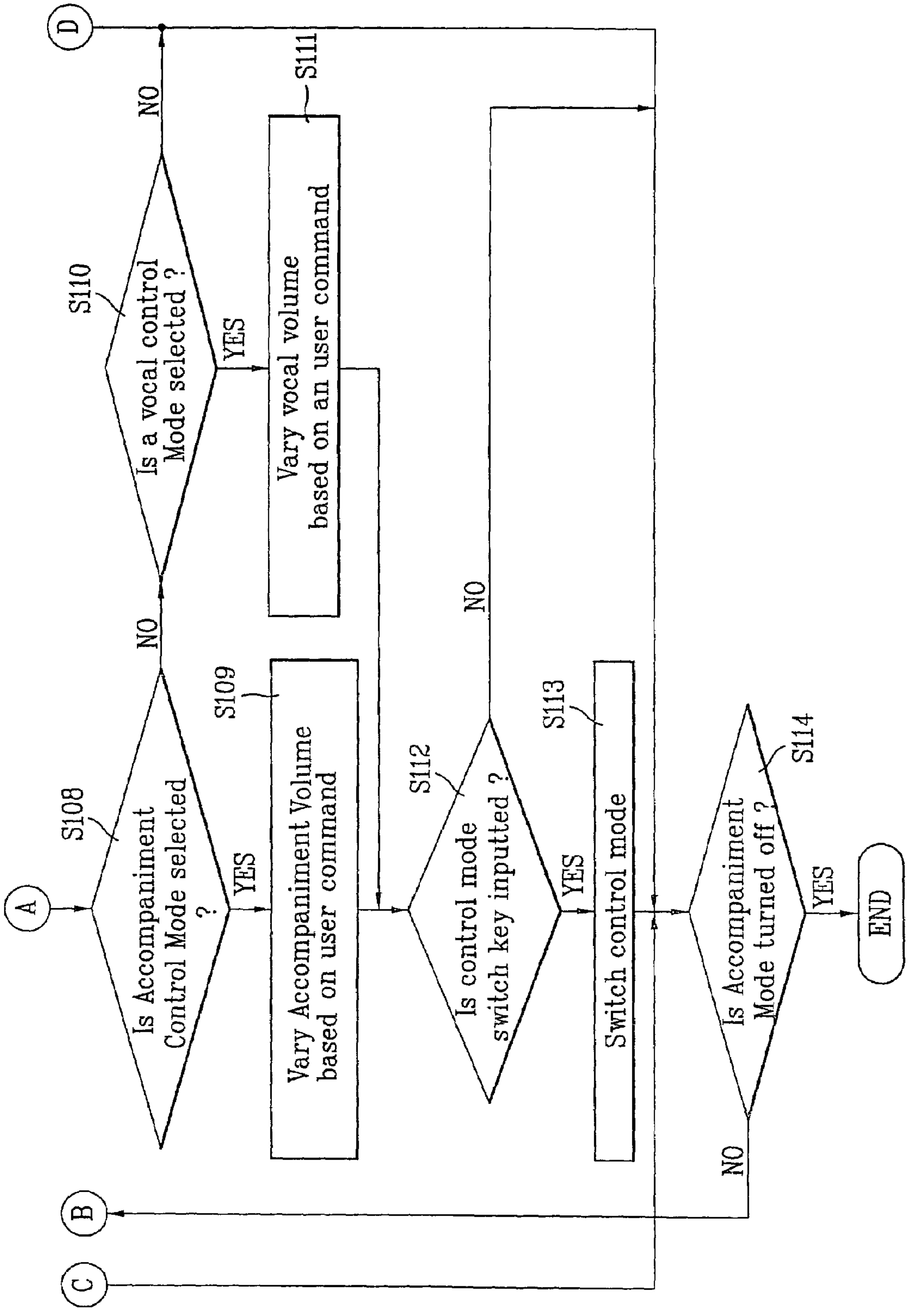

Referring to FIGS. 2A and 2B, when the user turns on the display device (S101), the microcomputer 109 represents an image and an audio of a broadcast program, and then, searches for the supplemental information corresponding to the broadcast program (S102). In case of a broadcasted music program, the microcomputer 109 identifies through the supplemental information as to whether the music program provides the Accompaniment Mode, whether the accompaniment signal and the vocal signal are formed in different streams, and whether the accompaniment and the vocal can be selectively controlled and represented. Accordingly, such identification could be displayed on a display 105 as an icon or a message.

While viewing a broadcast program, the user uses a key input unit 101 (i.e., a remote controller) to select the Accompaniment Mode (S103). At this point, the microcomputer 109 determines, based on the supplemental information, whether a music broadcast program is being broadcasted, or whether a song or a music is being received (S104).

When a music broadcast program is broadcasted, or when a music or song is being received, the microcomputer 109 controls the demultiplexer 103, so as to divide the accompaniment signal and the vocal signal, both included in the audio signal received. Then, the microcomputer 109 extracts a series of information on the accompaniment volume and the vocal volume, the band frequency of the accompaniment and the vocal, and so on, from the supplemental information (S105). In addition, depending upon the user's command, the microcomputer 109 can display the detected information on the accompaniment volume and the vocal volume, the band frequency of the accompaniment and the vocal, and so on.

Subsequently, the microcomputer 109 displays on the display 106 a menu or a window enabling the user to selectively control the accompaniment and the vocal signals. For example, a menu window including options for selecting one of an Accompaniment Control Mode and a Vocal Control Mode may be displayed. Herein, the Accompaniment Control Mode controls the volume, key level, and tone of the accompaniment can be controlled, and the Vocal Control Mode controls the volume, key level, and tone of the vocal can be controlled.

When the user selects the Accompaniment Control Mode by using the key input unit 101 (S108), the microcomputer 109 selectively varies the volume, key tone, and tone of the accompaniment according to the user's commands (S109). At this point, the microcomputer 109 controls the audio signal processor 106 so that the vocal is not outputted through the speaker 107.

Similarly, when the user selects the Vocal Control Mode S110, the microcomputer 109 selectively varies the volume, key level, and tone of the vocal according to the user's commands (S111). At this point, the microcomputer 109 outputs the accompaniment without carrying out any adjustments.

The microcomputer 109 determines whether a mode switch key (or button) is selected by the user (S112). When the user selects the mode switch key on the key input unit 101 or a remote-controller, the microcomputer 109 switches the control mode being executed into the other control mode. For example, the microcomputer 109 can switch from the Accompaniment Control Mode to the Vocal Control Mode, or from the Vocal Control Mode to the Accompaniment Control Mode (S113). In addition, in accordance with the user command, the microcomputer 109 displays the lyrics of the song along the accompaniment.

The above-described Accompaniment Control Mode and the Vocal Control Mode are given as examples to describe the present invention, and so the method for selectively controlling the accompaniment and the vocal can be varied diversely without limitations.

Apart from providing the user with the accompaniment of a song, another advantage of the present invention is that the accompaniment of a song from a broadcasted music program can also be stored in a memory 108, so as to be provided to the user for future use. When the user wishes to store a set of songs, the microcomputer 109 selectively stores the accompaniment and the vocal of a song from a broadcasted program. Subsequently, when the user wishes to command the accompaniment of the stored song to be played, the microcomputer 109 searches the memory 108 in accordance with the user command so as to identify the stored song (S106). Thereafter, if the stored song is identified, the microcomputer 109 displays a list of a plurality of stored songs.

After the user selects a song from the displayed list, the microcomputer 109 extracts and identifies a set of information on the volumes of the accompaniment and the vocal, the band frequencies of the accompaniment and the vocal, and so on, from the memory 108 (S107). In addition, according to the user command, the microcomputer 109 may display the set of information on the volumes of the accompaniment and the vocal, the band frequencies of the accompaniment and the vocal, and so on.

Subsequently, the microcomputer 109 displays a menu or a window on the display 106, so as to allow the user to selectively control the accompaniment and the vocal of the selected song. In addition, when the user selects the Accompaniment Control Mode, the microcomputer 109 selectively varies the volume, key level, and tone of the accompaniment in accordance with the user command. And, conversely, when the user selects the Vocal Control Mode, the microcomputer 109 selectively varies the volume, key level, and tone of the vocal in accordance with the user command.

Without departing from the scope or spirit of the present invention, a wide range of other forms can be applied herein. For example, when a user views a multiplex broadcasting program having multiple vocal signals of at least two languages, the user can selectively control the volume of each broadcasted language. Accordingly, not only can the user listen to the broadcasted program in the desired language, but the user can also view the program while listening to two or more languages simultaneously.

As aforementioned, the image display device with a built-in karaoke and the method for controlling the same according to the present invention are advantageous in that an audio of a broadcasted program is divided into a plurality of elements (or parts), so as to be selectively controlled when required. More specifically, in case of a broadcasted music program, the volumes of the accompaniment and the vocal can be selectively controlled. Accordingly, unlike the conventional karaoke apparatus, which only provides accompaniments, the vocal volume can also be omitted or varied.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An image display device, comprising:

a demultiplexer demultiplexing a received signal, which is a song of a broadcasted program received by a tuner, into a video signal, an audio signal and supplemental information, the audio signal comprising an accompaniment signal and a vocal signal;

a video signal processor converting the video signal into a displayable signal;

an audio signal processor converting the audio signal into a sound signal to be outputted by a speaker; and a microcomputer determining whether the accompaniment signal and the vocal signal can be selectively controlled and represented based on the supplemental information and controlling the audio signal processor so as to selectively output the accompaniment signal and the vocal signal when a user selects an accompaniment mode, wherein the demultiplexer divides the audio signal into the accompaniment signal and the vocal signal depending upon a control of the microcomputer.

2. The device according to claim 1, wherein the microcomputer displays one of an icon and a message on a screen to inform the user that the accompaniment signal and the vocal signal can be selectively controlled and represented.

3. The device according to claim 1, wherein the microcomputer stores the accompaniment signal and the vocal signal in a memory in accordance with a user command.

4. The device according to claim 3, wherein the microcomputer provides the accompaniment signal and the vocal signal, both stored in the memory, to the audio signal processor in accordance with the user command.

5. The device according to claim 3, wherein the microcomputer displays a list of songs corresponding to the accompaniment signal and the vocal signal, both stored in the memory, on a screen in accordance with the user command.

6. The device according to claim 1, wherein the microcomputer selectively controls a volume, a key level, and a tone of the accompaniment signal and the vocal signal in accordance with a user command.

7. The device according to claim 1, wherein the microcomputer displays one of a menu and a window on a screen, so as to allow the user to selectively control and represent the accompaniment signal and the vocal signal.

8. A method for controlling an image display device, comprising:

receiving an output signal, which is a song of a broadcasted program, and demultiplexing the received signal into an accompaniment signal, a vocal signal and supplemental information, and dividing the accompaniment signal and the vocal signal;

determining whether the accompaniment signal and the vocal signal can be selectively controlled and represented, based on the supplemental information; and selectively outputting the accompaniment signal and the vocal signal both included in the received signal, when a user selects an accompaniment mode.

9. The method according to claim 8, further comprising determining whether the accompaniment signal and the vocal signal are included in different streams, based on the supplemental information.

10. The method according to claim 8, wherein one of an icon and a message is displayed on a screen, so as to notify that the accompaniment signal and the vocal signal can be selectively controlled and represented, when the accompaniment signal and the vocal signal are determined to be controllable and representable.

11. The method according to claim 8, further comprising storing the accompaniment signal and the vocal signal in a memory in accordance with a user command.

12. The method according to claim 11, further comprising:

displaying a list of songs corresponding to the accompaniment signal and the vocal signal, both stored in the memory, in accordance with a user command; and reading and selectively outputting the accompaniment signal and the vocal signal of a song selected from the list from the memory.

13. The method according to claim 8, further comprising converting the accompaniment signal and the vocal signal, so as to selectively control a volume, a key level, and a tone of the accompaniment signal and the vocal signal in accordance with a user command.

14. The method according to claim 8, further comprising displaying one of a menu and a window enabling the user to selectively control and represent the accompaniment signal and the vocal signal.

15. The method according to claim 8, wherein a set of information related to an accompaniment volume, a vocal volume, an accompaniment frequency band and a vocal frequency band is displayed on a screen, after identifying the supplemental information.

16. The method according to claim 8, wherein the received output signal is a song of a broadcasted program received from a tuner.

* * * * *